No. 822,184. PATENTED MAY 29, 1906.
G. E. CHAMBERLAIN & J. J. MERRILL.
PUMP REGULATING SYSTEM.
APPLICATION FILED JUNE 15, 1905.
2 SHEETS—SHEET 1.
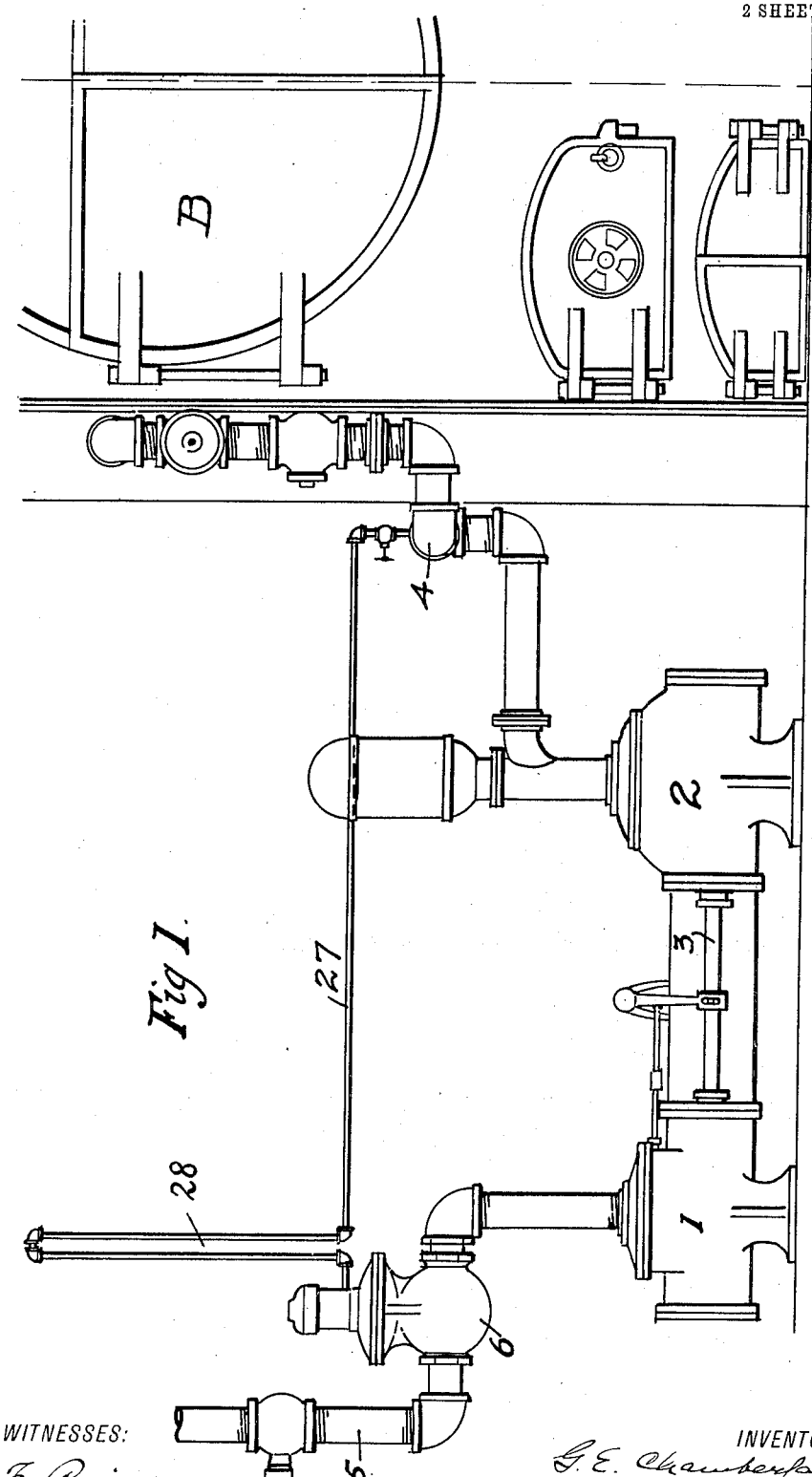
Fig. I.
WITNESSES:
INVENTORS:
ATTORNEYS.

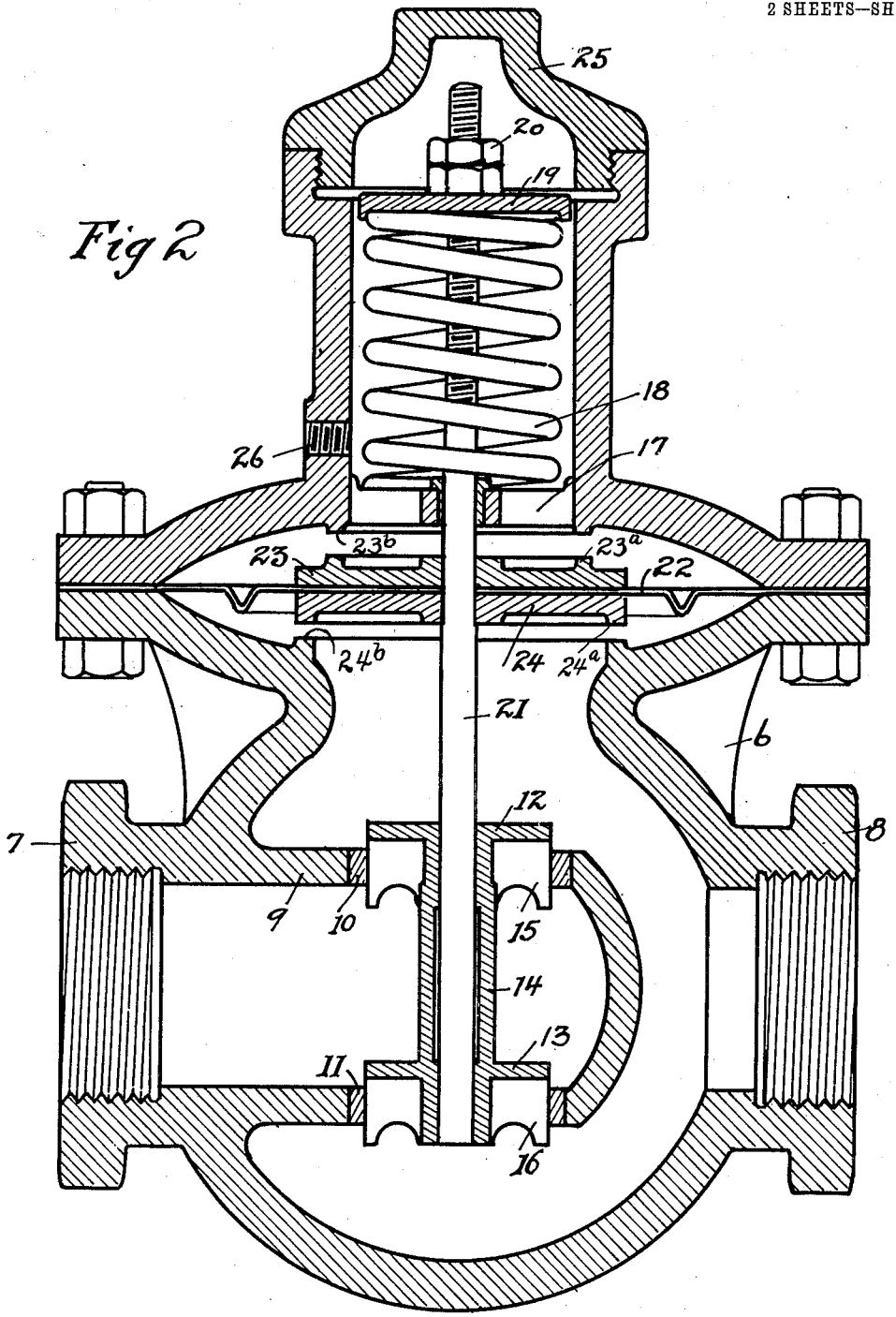

UNITED STATES PATENT OFFICE.

GEORGE E. CHAMBERLAIN, OF ST. LOUIS, MISSOURI, AND JOSEPH J. MERRILL, OF CHICAGO, ILLINOIS.

PUMP-REGULATING SYSTEM.

No. 822,184.　　　Specification of Letters Patent.　　　Patented May 29, 1906.

Application filed June 15, 1905. Serial No. 265,320.

*To all whom it may concern:*

Be it known that we, GEORGE E. CHAMBERLAIN, a citizen of the United States, and a resident of the city of St. Louis and State of Missouri, and JOSEPH J. MERRILL, a citizen of the United States, and a resident of the city of Chicago, county of Cook, and State of Illinois, have invented a new and useful Improvement in Pump-Regulating Systems, of which the following is a specification.

Our invention relates to systems and apparatus for regulating steam-pumps, and especially feed-water pumps.

It has for its principal objects to maintain a pressure of water differing from the steam-pressure by a constant amount, to maintain a constant water-pressure by a pump actuated by a fluid-pressure motor operating under constant pressure; to regulate the pressure of the water by automatically regulating the quantity of the motive fluid admitted to the throttle of the motor or directly to the motor, to automatically maintain the water in a boiler at a constant level, to provide a novel valve for controlling the supply of steam to the engine and controlled by the relative pressure of the water and the steam, and other objects hereinafter more fully appearing.

Our invention consists in the parts and in the arrangements and combinations of parts, hereinafter described and claimed.

In the accompanying drawings, forming a part of this specification, and wherein like symbols refer to like parts wherever they occur, Figure 1 is a view of an installation incorporating the invention. Fig. 2 is a cross-sectional view of the regulating-valve.

As an illustration of the invention an installation having a steam-engine 1 and a pump 2 of the reciprocating-piston type has been selected. It is to be understood, however, that the application of the invention is not limited to fluid-pressure motors and pumps of this type. The pistons of the engine and pump are directly connected by a common piston-rod 3. The water pumped by the pump is delivered into a pipe 4, leading to the boiler B. If the system is to be applied to a hydraulic system to maintain a constant pressure therein, the pipe 4 will be connected to the mains or the pipes of the distribution system. A steam-supply pipe 5 leads from the boiler to the throttle of the engine 1 or directly to the engine and is provided with a regulating-valve 6.

The valve 6 comprises a divided casing, the parts of which are bolted together. The lower part or body of the casing is provided with internally-screw-threaded connections 7 8 for connecting the sections of the steam-pipe to its opposite sides. A tubular part 9 extends inwardly from one of said connections and is provided with vertically-opposite valve-seats 10 11. A balanced valve coöperates with said seats. It comprises disks 12 13 of equal area connected by a tubular section 14 and provided with guide-wings 15 16.

The upper part or dome of the valve is provided with a spring-seat 17 near the lower portion. A spring 18 is seated on said spring-seat and bears at its upper end on a disk 19, secured by means of nuts 20 to a rod 21, which extends downwardly through said spring-seat and is connected to said balanced valve. By adjusting the nuts 20 the force necessary to seat said balanced valve may be varied, as desired.

The flexible diaphragm 22 is secured between the body and dome of the valve, and disks 23 24 secure the central portion of the diaphragm to said rod 21. This diaphragm may be of German silver or rubber or other suitable material, as desired. It separates the valve-casing into two non-communicating chambers. The disks 23 and 24 are provided with annular bearing-surfaces $23^a$ and $24^a$, respectively. The two parts of the valve-casing are provided with corresponding annular bearing-surfaces $23^b$ and $24^b$, which serve as stops to limit the movement of the diaphragm and of the balanced valve also, which is rigidly connected by means of the rod 21.

The dome comprises a cylindrical portion, which accommodates said spring 18 and which is closed by a cap 25.

A small pipe 27 is connected to the pipe 4, leading from the pump, and is connected to the dome of the valve by the tapped hole 26. It is provided with a U-shaped section 28, extending at right angles to its length, which serves two purposes. This U-shaped section permits expansion due to changes of temperature. It also permits the use of some liquid other than water in the dome of the valve. For example, the dome of the valve and at least part of one leg of the U-shaped section of the pipe may be filled with oil or other liquid which will not act upon the material of which the valve is constructed. The remainder of the pipe is filled with water. Thus the liquid in the dome of the valve is put under the pressure of the water in the pipe 4. If desired, the water may be admitted to the dome of the valve.

The regulating-valve is divided into two non-communicating chambers—one a steam-chamber, the other a chamber containing liquid under the pressure produced by the pump in the pipe 4. The diaphragm between the chambers is acted upon by the pressure of the steam and the liquid and, further, by the force exerted by the spring, which acts with the steam-pressure. When the water-pressure is greater than the combined forces exerted by the spring and the steam, the balanced valve will be seated and the supply of steam will be wholly or partially cut off. On the other hand, when the water-pressure is less than the combined forces of the steam and the spring the balanced valve will be raised, more steam will be admitted to the engine, and this condition will continue until the pressure of the water has been raised to the desired point. By properly regulating the tension of the spring the water-pressure can be maintained at a pressure which will be above the steam-pressure any desired constant amount. It is therefore possible to automatically maintain the water in the boiler at a substantially constant level. To force water into the boiler, it is necessary that the pressure in the main be equal to the steam-pressure in the boiler plus the pressure due to the weight of the water in the boiler and the resistance offered by the injector and the pipe-line. Hence the water-pressure in the main must exceed the steam-pressure by an ascertainable amount. If now the spring is adjusted to offer resistance equal to this excess of pressure, the valve will so control the steam-pump that the water will be maintained at a substantially constant level in the boiler. The moment the water gets too high in the boiler the water-pressure will increase and cause the supply of steam to the engine to be diminished or entirely cut off. When the water-level falls again, the water-pressure will decrease and cause the supply of steam to the engine to be increased. Thus by means of the valve the feed of water is automatically so regulated as to maintain the water-level in the boiler substantially constant, and hand regulation for this purpose may be dispensed with.

If the steam-pressure remains constant, the water-pressure will remain constant, and hence the system is applicable to any hydraulic system.

Obviously our system is capable of modification within the scope of our invention, and therefore we do not wish to be limited to the specific construction shown and described.

What we claim as our invention, and desire to secure by Letters Patent, is—

1. A system for regulating pumps comprising a pump, a fluid-pressure motor operatively connected to said pump to actuate the same, a valve to control the supply of motive fluid to said motor, a mechanically-distended diaphragm operatively connected to said valve, non-communicating chambers upon opposite sides of said diaphragm, means to produce the pressure of the motive fluid in one chamber, and means to produce in the other chamber the pressure of the liquid delivered by the pump, the areas of the two sides of the diaphragm exposed to such pressures being substantially equal.

2. A system for regulating pumps comprising a pump, a fluid-pressure motor operatively connected to said pump to actuate the same, a valve to control the supply of motive fluid to said motor, a spring-distended diaphragm operatively connected to said valve, non-communicating chambers upon opposite sides of said diaphragm, means to produce the pressure of the motive fluid in one chamber, and means to produce in the other chamber the pressure of the liquid delivered by the pump, the areas of the two sides of the diaphragm exposed to such pressures being substantially equal.

3. A system for regulating pumps comprising a pump, a fluid-pressure motor operatively connected to said pump to actuate the same, a pipe to conduct the motive fluid to said motor provided with a regulating-valve having non-communicating chambers, a diaphragm between said chambers, and a balanced valve operatively connected to said diaphragm, the motive fluid filling one of said chambers, a pipe to convey the liquid delivered by said pump, and means to transmit the pressure in said last-mentioned pipe to the other of said chambers, the areas of the two sides of the diaphragm exposed to pressure being substantially equal.

4. A system of pump-regulation comprising a pump, a fluid-pressure motor operatively connected to said pump to actuate the same, a pipe to conduct the motive fluid to said motor, a pipe to carry the liquid discharged by said pump, and a regulating-valve having non-communicating chambers in communication, respectively, with said pipes, and having a valve arranged to be actuated by the difference between the pressures of said motive-fluid pressure and of said liquid, and a spring arranged to exert force upon said valve in the direction of one of said pressures, the pressure areas of said valve being substantially equal.

5. A system for regulating feed-water pumps comprising a boiler, a pump, a pipe connecting said pump and said boiler, a steam-engine operatively connected to said pump, a steam-pipe connecting said engine and said boiler and provided with a regulating-valve having non-communicating chambers, a diaphragm between said chambers, one of said chambers being filled with steam and a spring arranged to coact with the steam on said diaphragm, and a pipe leading from said water-pipe to the other chamber of said valve, whereby the pressure in said pipe may be induced in said chamber, the respective pressure areas of said diaphragm being substantially equal.

6. A regulating-valve comprising a casing, a flexible diaphragm separating said casing into two non-communicating chambers, a spring-seat mounted in one of said chambers, a spring seated on said spring-seat, a valve in the other of said chambers, and a rod connecting said valve, diaphragm and spring.

7. A regulating-valve comprising a casing, a flexible diaphragm separating said casing into two non-communicating chambers, a spring-seat mounted in one of said chambers, a spring seated on said seat, a rod connected to said diaphragm and adjustably connected to said spring, and a balanced valve in the other of said chambers and connected to said diaphragm to move therewith.

8. A regulating-valve comprising a casing, a flexible diaphragm separating said casing into non-communicating chambers, a balanced valve operatively connected to said diaphragm, members secured to said diaphragm having bearing-surfaces, and stops on said casing coöperating with said members to limit the amplitude of vibration of said diaphragm.

In testimony whereof we have signed our names to this specification in the presence of the subscribing witnesses.

G. E. CHAMBERLAIN.
J. J. MERRILL.

Witnesses as to signature of G. E. Chamberlain:
FRED F. REISNER,
J. B. MEGOUN.

Witnesses as to signature of J. J. Merrill:
S. M. ARESON,
JESSIE F. PIERCE.